United States Patent
Ito et al.

(10) Patent No.: US 10,875,227 B2
(45) Date of Patent: Dec. 29, 2020

(54) RESIN MOLDED PRODUCT AND MOLDING DEVICE

(71) Applicant: KOITO MANUFACTURING CO., LTD., Tokyo (JP)

(72) Inventors: Hiroya Ito, Shizuoka (JP); Takatoshi Inoue, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 286 days.

(21) Appl. No.: 15/754,722

(22) PCT Filed: Aug. 12, 2016

(86) PCT No.: PCT/JP2016/073772
§ 371 (c)(1),
(2) Date: Feb. 23, 2018

(87) PCT Pub. No.: WO2017/033775
PCT Pub. Date: Mar. 2, 2017

(65) Prior Publication Data
US 2018/0250859 A1  Sep. 6, 2018

(30) Foreign Application Priority Data

Aug. 26, 2015 (JP) ................................ 2015-166371

(51) Int. Cl.
*B29C 33/42* (2006.01)
*B29C 33/00* (2006.01)
(Continued)

(52) U.S. Cl.
CPC ...... *B29C 45/2708* (2013.01); *B29C 33/0077* (2013.01); *B29C 33/42* (2013.01);
(Continued)

(58) Field of Classification Search
CPC .............. B29C 33/0077; B29C 33/422; B29C 45/2703; B29C 45/2756
See application file for complete search history.

(56) References Cited

U.S. PATENT DOCUMENTS

2008/0318051 A1\* 12/2008 Brown ................ B29C 45/0025
428/409
2013/0149486 A1   6/2013 Muller et al.

FOREIGN PATENT DOCUMENTS

JP        6-39877 A      2/1994
JP     2005-305749 A    11/2005
(Continued)

OTHER PUBLICATIONS

International Search Report dated Nov. 8, 2016, by the International Searching Authority in counterpart International Application No. PCT/JP2016/073772 (PCT/ISA/210).
(Continued)

*Primary Examiner* — Jacob T Minskey
*Assistant Examiner* — Virak Nguon
(74) *Attorney, Agent, or Firm* — Sughrue Mion, PLLC

(57) ABSTRACT

A transparent resin molded product and a mold for molding the product are provided in which occurrence of silver streak in the resin molded product is prevented. The resin molded product includes a design portion and a non-design portion, at least a part of the design portion is molded by transparent resin, and a gate trace (a gate arrangement position during the resin molding) is disposed in the non-design portion (runner portion). A foreign matter restraining portion for restraining foreign matters and bubbles contained in the transparent resin is disposed in the vicinity of the gate trace of the non-design portion. The foreign matters and bubbles are restrained by the foreign matter restraining portion and are prevented from flowing to the design portion, and (Continued)

therefore the occurrence of silver streak on the design portion can be prevented.

8 Claims, 5 Drawing Sheets

(51) Int. Cl.
  B29C 45/00 (2006.01)
  B29C 45/63 (2006.01)
  B29C 45/27 (2006.01)
  B29L 11/00 (2006.01)
(52) U.S. Cl.
  CPC .......... *B29C 45/0025* (2013.01); *B29C 45/27* (2013.01); *B29C 45/63* (2013.01); *B29C 2033/422* (2013.01); *B29C 2045/0027* (2013.01); *B29L 2011/0016* (2013.01)

(56) References Cited

FOREIGN PATENT DOCUMENTS

| JP | 2010-214749 A | | 9/2010 |
|---|---|---|---|
| JP | 2012-192605 A | | 10/2012 |
| JP | 2012192605 A | * | 10/2012 |
| JP | 2013-540610 A | | 11/2013 |
| JP | 2014-124782 A | | 7/2014 |
| JP | 2014124782 A | * | 7/2014 |

OTHER PUBLICATIONS

Written Opinion dated Nov. 8, 2016, by the International Searching Authority in counterpart International Application No. PCT/JP2016/073772 (PCT/ISA/237).

* cited by examiner

RESIN MOLDED PRODUCT AND MOLDING DEVICE

TECHNICAL FIELD

The present invention relates to a resin molded product and a molding device therefor.

BACKGROUND ART

A so-called clear resin molded product (transparent resin molded product) such as an outer lens and an outer cover of a vehicle lamp is resin molded by an injection molding method using molds. When the clear resin molded product is resin molded, the clearness of the lens may be reduced to cause a problem called silver streak, which is silver-like muddy in the vicinity of a gate, that is, in the vicinity of the gate which injects resin into a mold cavity. This problem is particularly significant in a clear resin molded product molded by using a mold with a direct gate structure in which the gate is directly arranged to a cavity or a side gate structure. It is considered that the silver streak is caused by foreign matters (slags) such as burrs adhered to the gate or bubbles (air) entrained when the resin is injected being injected into the cavity together with the resin.

Such silver streak deteriorates the appearance of the outer cover or the vehicle lamp to cause a quality problem. In order to prevent such silver streak, Patent Document 1 proposes a mold provided with a design surface valve gate for molding a design surface portion in a cavity of the mold and a side valve gate for molding a portion which is not the design surface. During the resin molding, resin is first injected from the side valve gate, the side valve gate is closed immediately before the injected resin flows to the design surface portion, and resin is injected from the design surface valve gate at the same time.

PRIOR ART DOCUMENT

Patent Document

Patent Document 1: JP-A-2010-214749

SUMMARY OF THE INVENTION

Problem to be Solved by the Invention

According to the technique of Patent Document 1, the silver streak can be eliminated. However, the design surface valve gate and the side valve gate are both required for one cavity, so that the mold structure becomes complicated. Also, it is necessary to control opening and closing while associating the design surface valve gate with side valve gate during the resin molding, so that the control is complicated. In particular, it can be expected that the opening and closing timing of these valve gates need to be adjusted according to a type of the resin and the temperature or the like, and therefore, it is considered reliably preventing the silver streak is difficult.

Accordingly, an object of the present invention is to provide a resin molded product and a molding device in which the occurrence of silver streak can be effectively prevented merely by changing a partial structure of the transparent resin molded product and by changing a cavity structure of molds corresponding to the structural change.

Means for Solving the Problem

The resin molded product according to the present invention includes a design portion and a non-design portion, at least a part of the design portion is molded by transparent resin, and a gate used in resin molding is arranged in the non-design portion. Further, a foreign matter restraining portion configured to restrain foreign matters and bubbles contained in the transparent resin is disposed in a vicinity of a gate arrangement position of the non-design portion. The foreign matter restraining portion may be disposed between the gate arrangement position and the design portion. In addition, the foreign matter restraining portion may be configured such that a thickness dimension or a width dimension of the non-design portion is partially increased.

The molding device according to the present invention includes a cavity for molding a molded product having a design portion and a non-design portion, and a gate which is disposed at a position of the cavity corresponding to the non-design portion and configured to inject resin in the cavity. A well portion which is configured to regulate a flow of the resin to restrain a flow of foreign matters or bubbles is provided in a vicinity of the gate disposed at the position of the cavity corresponding to the non-design portion. The well portion may be disposed between the gate and the design portion. In addition, the well portion may be formed as a concave portion which is formed by being concaved from a cavity surface of the cavity.

Effect of the invention

According to the molding device of the present invention, the flow of the resin flowing from the gate to the design portion is regulated in the well portion provided at the non-design portion, and the foreign matters and bubbles contained in the resin are restrained by the regulation. Therefore, the foreign matters and bubbles do not flow to the design portion, and the occurrence of silver streak on the design portion is prevented accordingly. In addition, in the resin molded product molded by the molding device of the present invention, since the foreign matter restraining portion for restraining the foreign matters and bubbles is provided in the non-design portion, no silver streak is observed on the design portion.

DESCRIPTION OF EMBODIMENTS

Figure 1:
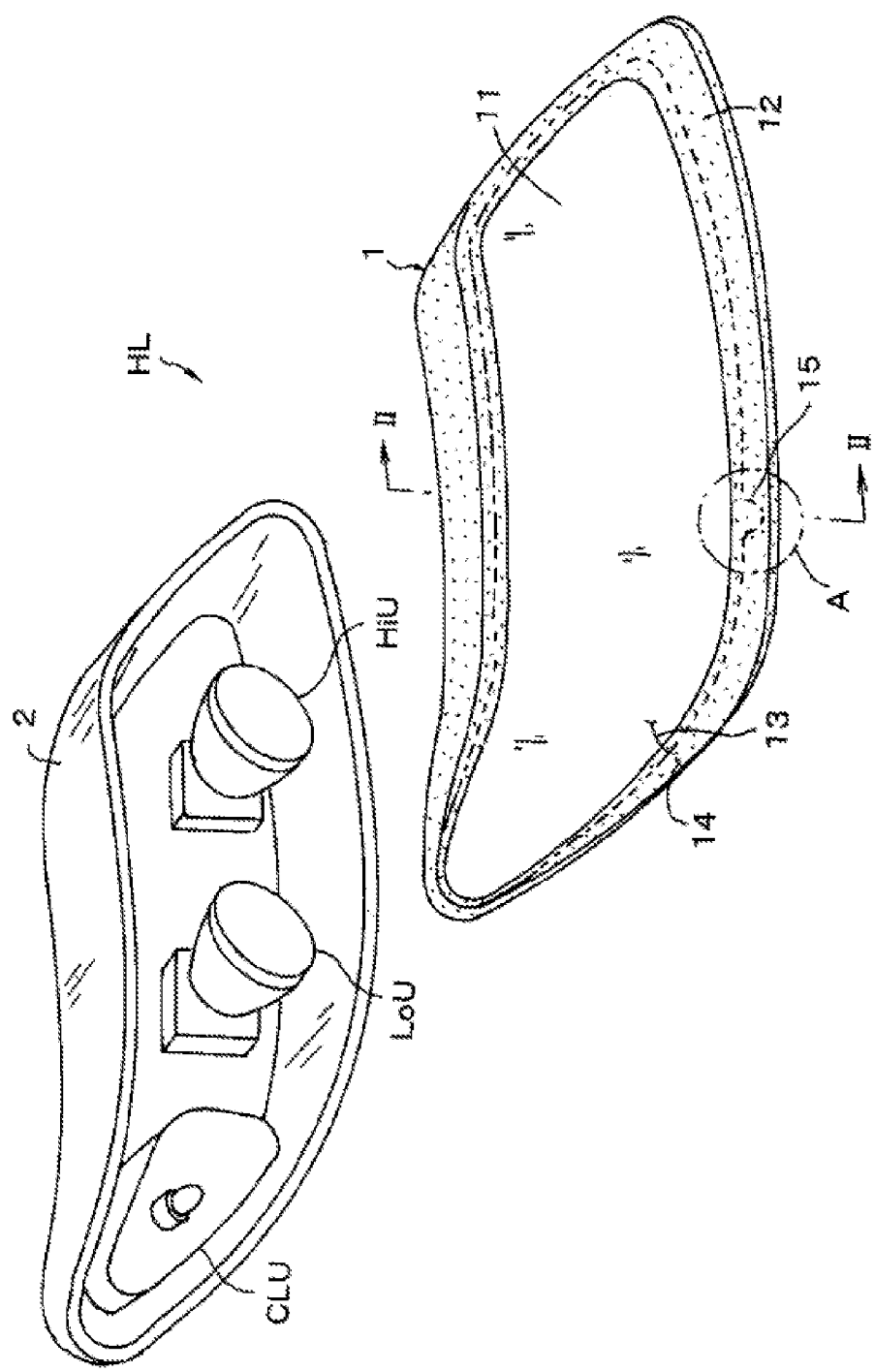
FIG. 1 is an exploded perspective view of a head lamp including an outer cover of an embodiment.

Hereinafter, embodiments of the present invention will be described with reference to the drawings. FIG. 1 is a schematic exploded perspective view of an embodiment in which the present invention is applied to an outer cover (also referred to as an outer lens or front cover) 1 of a head lamp HL of an automobile. The outer cover 1 is fixed to a front opening of a lamp body 2 of the head lamp HL and seals lamp units such as a clearance lamp unit CLU, a low beam light distribution lamp unit LoU, or a high beam light distribution lamp unit HiU mounted in the lamp body 1.

Figure 2:
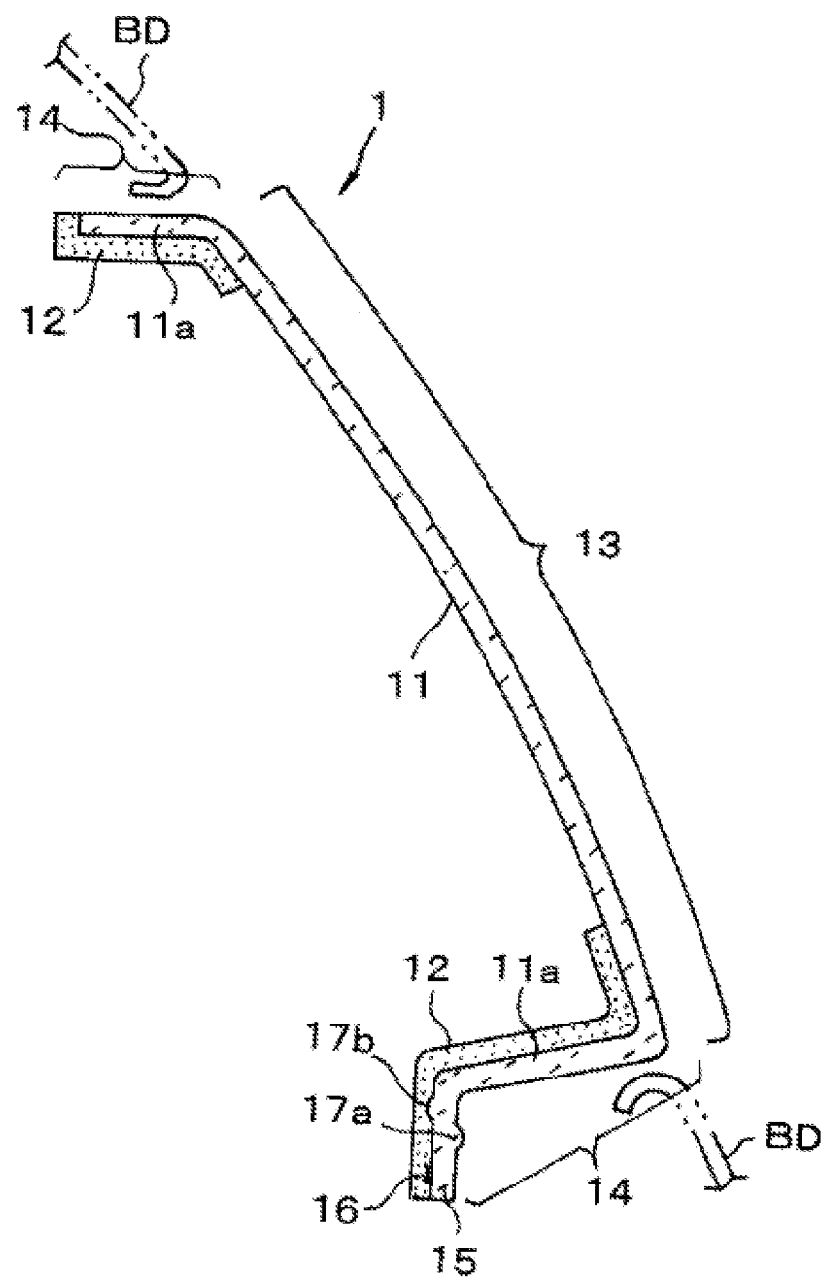
FIG. 2 is a sectional view taken along a line II-II of FIG. 1.

FIG. 2 is a sectional view taken along a line II-II of FIG. 1. The outer cover 1 is configured by a transparent and colorless light-transmitting portion (clear portion) 11 configured over substantially an entire surface area thereof, and a non-light transmitting portion 12 which is black or the like and integrated by two-color molding on a back surface of a peripheral region of the light-transmitting portion 11. It can also be said that the outer cover 1 is configured by a design portion 13 which can be observed from the outside when assembled to a body BD of an automobile as the head lamp HL, and a non-design portion 14 which is covered and hidden by a part of the body BD and cannot be observed from the outside. Here, a region of the light-transmitting portion 11 including a part of an inner edge side of the non-light-transmitting portion 12 and surrounded by the non-light-transmitting portion 12 is configured as the design portion 13.

A part of a lower edge region configured as the non-design portion 14 in the light-transmitting portion 11 is integrally formed with a runner portion 15 for arranging a gate for injection molding. That is, the periphery of the light-transmitting portion 11 has a peripheral wall portion 11a bent in a thickness direction, and the peripheral wall portion 11a functions as a leg portion for fixing the outer cover 1 to the lamp body 1. The runner portion 15 is provided on a part of the peripheral wall 11a and is formed into a tongue shape protruding outward with a required width dimension, so as to obtain a distance from the design portion 13 to a gate to be arranged. The non-light-transmitting portion 12 is formed on an inner surface of the runner portion 15 and is located in a region of the non-design portion 14 thereby being not exposed from the outside.

FIG. 3A is an enlarged front view of a portion A in FIG. 1, and FIG. 3B is a sectional view thereof. A gate trace 16, which is a trace when resin is injected at the time of molding, is generated on the runner portion 15. Two protruding strip portions 17a, 17b extending across substantially the entire width direction of the runner portion 15 are formed on the front surface and the back surface of the region where the non-light-transmitting portion 12 is formed, at positions on the runner portion 15 and particularly between the gate trace 16 and the design portion 13. The protruding strip portions 17a, 17b, which will be described later, are structures for preventing the occurrence of silver streak and are configured as a foreign matter restraining portion in the present invention.

Figure 4:
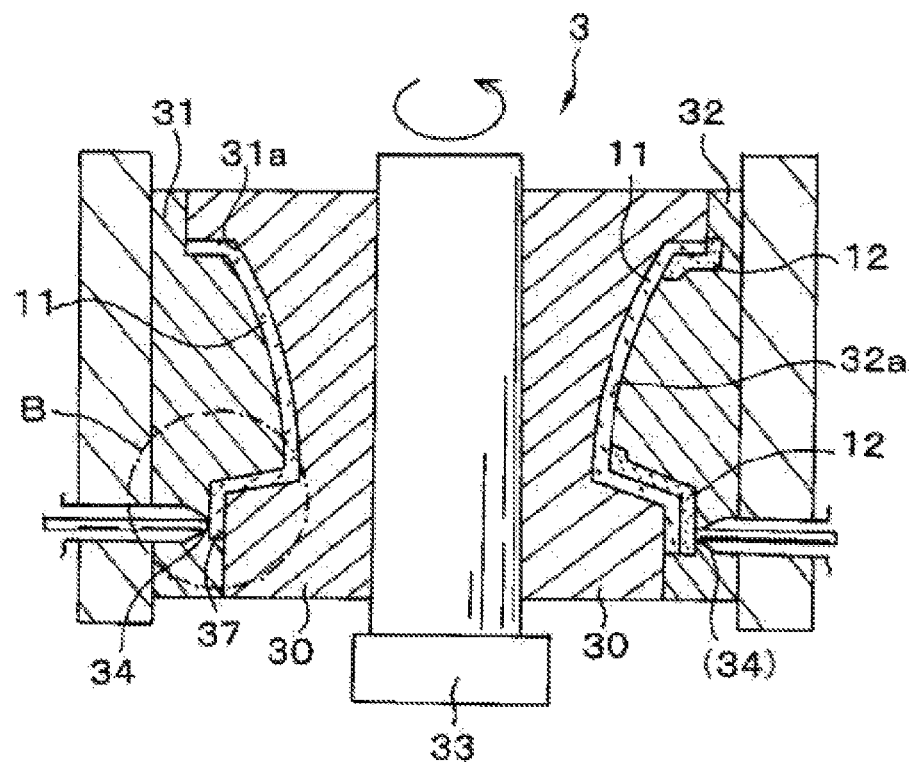
FIG. 4 is a conceptual configuration diagram of a two-color molding device.

FIG. 4 is a conceptual configuration diagram of a two-color molding device 3 for molding the outer cover 1. The molding device 3 is configured such that two common molds 30 arranged symmetrically with respect to a shaft 33 are rotatable around the shaft 33 in a horizontal direction, and a primary mold 31 and a secondary mold 32 are arranged on both sides sandwiching the common molds 30. The light-transmitting portion 11 of the outer cover 1 is formed by injecting colorless transparent resin into a primary cavity 31a formed by the common mold 30 and the primary mold 31. The molded light-transmitting portion 11 is rotated to the secondary mold 32, and black resin is injected into a secondary cavity 32a formed by the common mold 30 and the secondary mold 32, so that the non-light-transmitting portion 12 integrated with the light-transmitting portion 11 is molded in two colors, and the outer cover 1 is molded.

Figure 5:
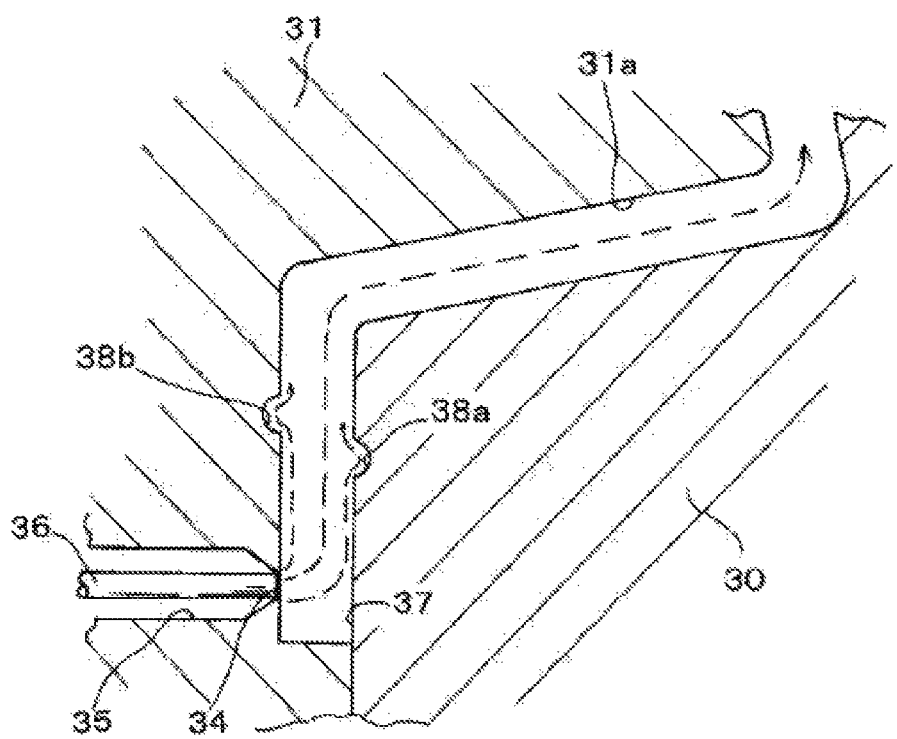
FIG. 5 is an enlarged sectional view of a portion B in FIG. 4.

FIG. 5 is an enlarged sectional view of a portion B in FIG. 4 and shows a state in which the primary cavity 31a for molding the light-transmitting portion 11 by the common mold 30 and the primary mold 31 is configured. A gate 34 facing the primary cavity 31a and configuring a side gate is disposed on the primary mold 31. The gate 34 has a hot runner 35 connecting with the primary cavity 31a and a gate pin 36 for opening and closing the gate 34. The molten resin is injected from the gate 34 into the primary cavity 31a through the hot runner 35. In addition, the gate cut can be made at the time of demolding by closing the gate pin 36.

It is noted that the primary cavity 31a has the same shape as the light-transmitting portion 11, but only a portion of the primary cavity 31a corresponding to the non-design portion 14 is shown in FIG. 5. A runner cavity portion 37 for forming the runner portion 15 is configured at a part of the primary cavity 31a in the non-design portion 14, and the gate 34 is disposed to face the runner cavity portion 37.

In the runner cavity portion 37, two well portions 38a, 38b are provided on a path from the gate 34 to a portion corresponding to the design portion 13. The well portions 38a, 38b have the same shape as the protruding portions 17a, 17b shown in FIG. 3A and extend in a curved shape across a region near the entire width direction of the runner cavity portion 37 in a region from the gate 34 toward the design portion 13. The well portions 38a, 38b are configured as concave strip portions which are concaved such that each cavity surface of the common mold 30 and the primary mold 31 configuring the runner cavity portion 37 are a substantially semicircular sectional shape.

In order to resin mold the light-transmitting portion 11 using the molding device having such configuration, molten transparent resin is injected from the gate 34 into the primary cavity 31a formed by the common mold 30 and the primary mold 31. As shown by the broken line arrow in FIG. 5, the resin injected from the gate 34 flows into the runner cavity portion 37 and flows from the non-design portion 14 to each region of the design portion 13 shown in FIG. 2. The resin is injected into the entire area of the primary cavity 31a, and the light-transmitting portion 11 is molded by separating the primary mold 31 from the common mold 30 at the timing when the resin solidifies. Thereafter, as described above, the secondary molding by the secondary mold 32 is performed, so that the two-color molding of the outer cover 1 is completed.

During such molding of the light-transmitting portion 11, foreign matters (slags) and bubbles (air) may be mixed in the resin injected from the gate 34. The foreign matters are minute resin pieces generated by curing a part of the resin remaining in the gate 34 at the time of molding a previous light-transmitting portion 11 by the primary mold 31, and the minute resin pieces are mixed in the resin injected from the gate 34 at the time of the present molding. The bubbles are air mixed in the resin within the resin flow path when or before the resin is heated in the hot runner 35.

When the resin mixed with the foreign matters and bubbles is injected from the gate 34 to the runner cavity portion 37, a part of the resin flows into the well portions 38a, 38b when flowing through the runner cavity portion 37. Therefore, the flow of the resin is temporarily regulated in the well portions 38a, 38b, and a part of the flow of the resin is disturbed due to the regulation. The flow of the foreign matters mixed in the resin is restrained in the well portions 38a, 38b due to the disturbance. Further, the bubbles mixed in the resin are also restrained in the well portions 38a, 38b.

As a result, the foreign matters and bubbles mixed in the resin are reduced and prevented from passing through the well portions 38a, 38b and then flowing to the design portion 13. Even if a few foreign matters and bubbles might reach the non-design portion 14, those will not reach the design portion 13. Thereby, silver streak due to the foreign matters or air bubbles are prevented from occurring on the design portion 13 of the molded light-transmitting portion 11.

In the present embodiment, since the well portions 38a, 38b extend over substantially the entire width of the runner cavity portion 37, almost all of the resin flowing from the gate 34 to the design portion 13 is regulated by the well portions 38a, 38b, and the foreign matters and bubbles are restrained. In addition, since the well portions 38a, 38b are positioned corresponding to both surfaces of the runner cavity portion 37, that is, both surfaces of the flowing resin, the regulation of the resin is also carried out in both surfaces, and an effect of restraining the foreign matters and bubbles is improved. As a result, an effect of preventing the silver streak is improved.

Incidentally, since there is almost no regulation for the flow of the resin flowing from the runner cavity portion 37 to the non-design portion 14 and the design portion 13 in a case where the well portions 38a and 38b are not provided, the foreign matters and bubbles mixed in the resin are flowed together with the resin. Generally, a length that the foreign matters and bubbles can flow is about 50 to 70 mm. Therefore, when a distance between the gate 34 and the design portion 13 is shorter than that length, the silver streak would be generated on the design portion 13 of the light-transmitting portion 11.

Figure 3:
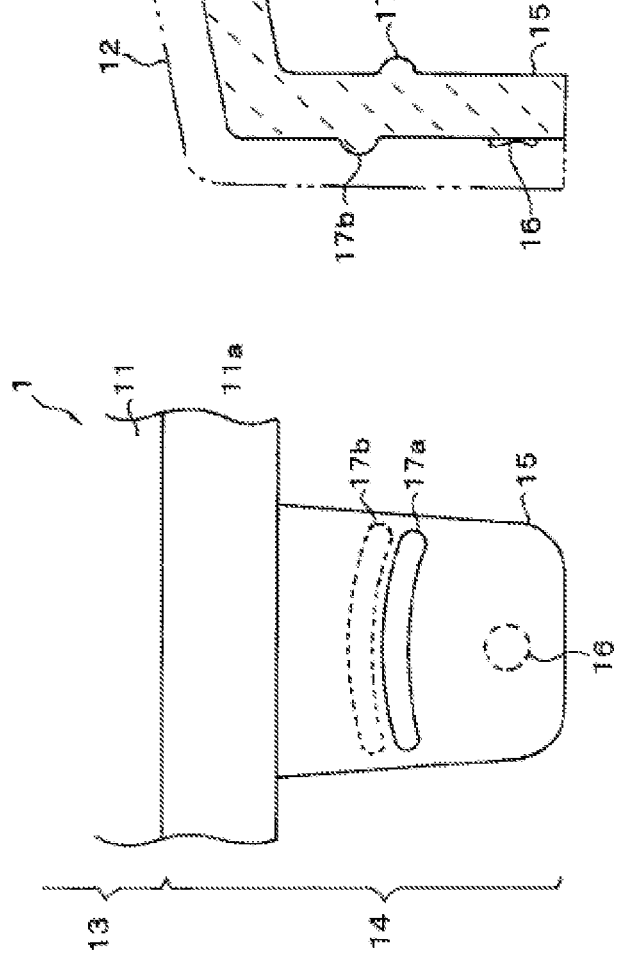
FIG. 3A is an enlarged front view of a portion A in FIG. 1.
FIG. 3B is a sectional view of the portion A.

As shown in FIG. 3, the protruding strip portions 17a, 17b corresponding to the well portions 38a, 38b, that is, a foreign matter restraining portion of the present invention is formed in the light-transmitting portion 11 thus molded. Since the foreign matters and bubbles are restrained in the foreign matter restraining portion 17a, 17b, the silver streak may be generated thereon. However, the foreign matter restraining portion 17a, 17b is formed at the runner portion 15, and the non-light-transmitting portion 12 is formed on a back surface of the runner portion 15 by two-color molding, so that the silver streak is hardly noticeable from the appearance. Moreover, since the runner portion 15 is present in the non-design portion 14, it is not observed from the outside when attached to the body BD of an automobile and the appearance of the head lamp HL is not deteriorated.

As described above, the silver streaks can be effectively prevented merely by changing the structure of adding the well portions 38a and 38b to the runner cavity portion 37 which is a part of the cavity of the molds configuring the molding device, and in the present embodiment, a part of the primary cavity 31a provided on the primary mold 31 for disposing the gate 34. Therefore, the present invention can be applied by using an existing mold as it is and a structure thereof is not complicated. Further, the molding process does not change any existing process and the molding can be performed extremely easily.

In the present embodiment, the well portions 38a, 38b, each configured by one concave strip portion, are formed on a front surface and a back surface of the runner cavity portion 37, that is, cavity surfaces of the primary mold 31 and the common mold 30, but in a case where a space is relatively affordable, a well portion configured by a plurality of concave strip portions may be formed on either or both of the cavity surfaces. An effect of regulating the flowing resin is improved by the plurality of well portions, and an effect of restraining the foreign matters and bubbles is also improved.

According to the present invention, the well portion structure is not limited to the structure of the present embodiment, as long as the flow of the resin, which is injected from the gate 34 disposed at the non-design portion 14, is regulated in the well portions 38a, 38b at the non-design portion 14 while the resin flows to the design portion 13, and the foreign matters and bubbles can be restrained in the well portions.

Figure 6A:
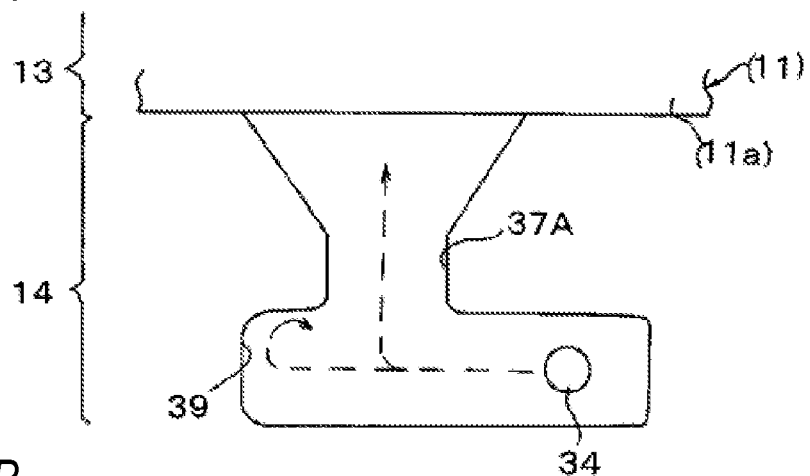
FIGS. 6A to 6C are respective front views of a main part of a runner cavity and a well portion in the first to third modifications.

FIG. 6A is a schematic front view of a runner cavity portion in a primary cavity of a first modification. Here, a runner cavity portion 37A for molding the runner portion (since the runner portion has the same shape as the runner cavity portion, illustration thereof is omitted here) of the light-transmitting portion 11 is formed into a shape bent into an approximately L shape. Moreover, one end of the runner cavity portion 37A is extended toward the design portion 13 from the non-design portion 14 while being widened in a tapered manner. Further, the other end portion of the runner cavity portion 37A is closed, and the gate 34 is disposed in the vicinity thereof. A bent portion nearly perpendicular to the runner cavity portion 37A protrudes sideward by a predetermined dimension along a direction extending from the gate 34, and a hollow portion generated at the protruding portion is configured as a second well portion 39.

In the first modification, the resin injected from the gate 34 flows while being bent in the runner cavity portion 37A, and reaches the non-design portion 14 and the design portion 13, thereby molding the light-transmitting portion 11. When the resin to flow through the runner cavity portion 37A flows from the gate 34 to the bent portion, a part thereof enters the second well portion 39 and the flow is regulated in the second well portion 39. Thereby, the flow of the resin is disturbed, foreign matters and bubbles mixed in the resin are restrained, and the foreign matters and bubbles are reduced or removed from the resin flowing from the bent portion toward the design portion 13.

As a result, in the light-transmitting portion 11 of the molded outer cover 1, the foreign matters and bubbles do not reach the design portion 13, and the occurrence of silver streak on the design portion 13 can be prevented. Even if not being restrained by the second well portion 39, a part of the foreign matters and bubbles will not flow to the design portion 13. In this case, even when foreign matters and bubbles flow to the non-design portion 14 and the silver streak occurs, the non-design portion 14 is covered and hidden by a body, so that the appearance of a head lamp is not deteriorated.

In a first modification, as shown by virtual lines in FIG. 6A, the second well portion 39 may be formed into a trapezoidal shape or other shapes which are not shown. When the second well portion 39 is formed into the trapezoidal shape, a flow of resin entering the second well portion 39 is significantly disturbed, an effect of restraining the foreign matters and bubbles is improved, and an effect of preventing silver streak is improved.

Figure 6B:
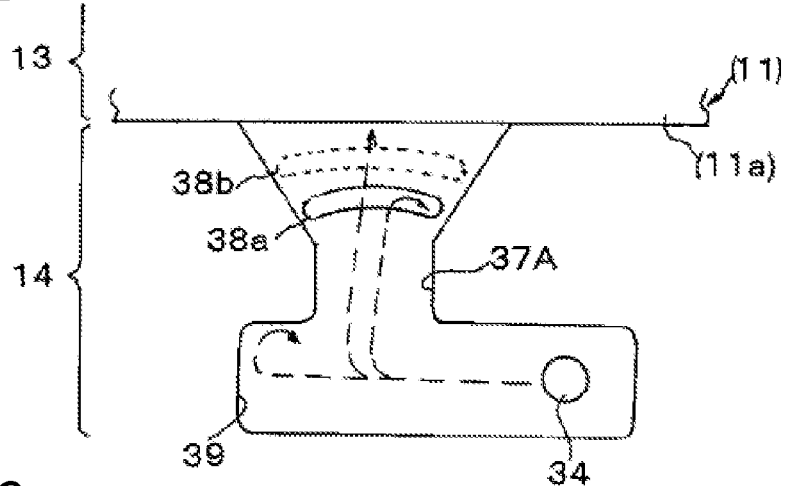

In a second modification, as shown in FIG. 6B, the second well portion 39 of the first modification and the well portions 38a, 38b (refer to as a first well portion with respect to the second wall portion) of the embodiment may be provided at the same time. In the present modification, the runner cavity portion 37A is formed into an approximately L shape as in the first modification, the second well portion 39 is formed at a bent portion thereof, and the first well portions 38a, 38b configured by the same concave strip portions as that in the embodiment are formed into a tapered shape region at an end of the runner cavity portion 37A.

In the second modification, a part of resin injected from the gate 34 flows into the second well portion 39 while flowing through the runner cavity portion 37A, and the flow is regulated in the second well portion 39. Thereby, the flow of the resin is disturbed, and foreign matters and bubbles mixed in the resin are restrained. Furthermore, the flow of the resin flowing through the bent portion is regulated in the first well portions 38a, 38b, and foreign matters and bubbles remaining in the resin are restrained therein. As a result, the foreign matters and bubbles contained in the resin flowing from the runner cavity portion 37A to the design portion 13 are reduced or removed, and the occurrence of silver streak on the design portion 13 is prevented.

Figure 6C:
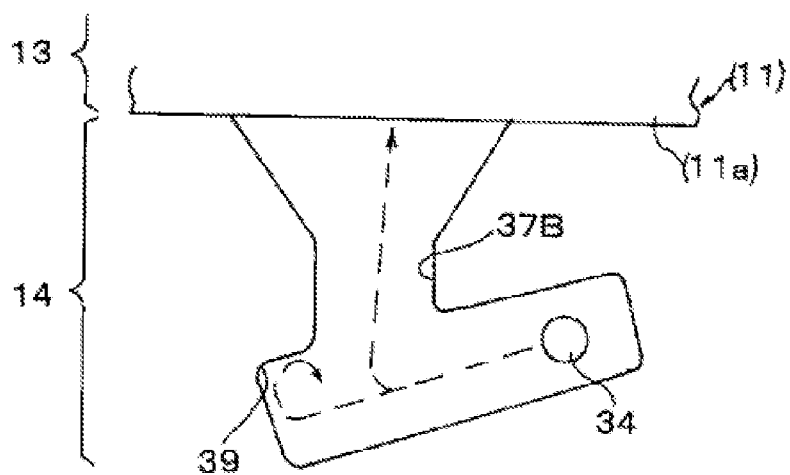

In a third modification, as shown in FIG. 6C, a runner cavity portion 37B may be formed into an L shape bent at an acute angle. The second well portion 39 is provided at a bent portion as in the first modification. In the runner cavity portion 37B, since the resin flows while being bent at the bent portion at the acute angle, an amount of the resin entering the second well portion 39 is increased, so that an effect of regulating the flow of the resin can be increased, an effect of restraining the foreign matters and bubbles can be increased, and an effect of preventing the silver streak can be improved.

As described above, the well portion according to the present invention may configured such that concave portions, such as the first well portions, are provided in a thickness direction of the runner cavity portion, and may also configured such that a concave portion, such as the second well portion, is provided in a width direction within a plane of the runner cavity portion. Of course, the first well portion and the second well portion may be used in combination as in the second modification.

In the above-described embodiments, an example of the two-color molded outer cover formed by the light-transmitting portion and the non-light-transmitting portion has been described, but the present invention can similarly be applied to an outer cover with a single configuration including only a light-transmitting portion and without a non-light-transmitting portion. In this case, a runner portion is provided at a non-design portion of the light-transmitting portion, and a restraining portion for restraining foreign matters and bubbles is disposed in the runner portion.

In addition, the runner portion is not necessarily required in the present invention. When a length of the non-design portion is equal to or longer than a required length, a gate may be disposed in the non-design portion without providing the runner portion, and a restraining portion for restraining the foreign matters and bubbles, that is, a well portion may be disposed at a part of the non-design portion.

This application is based on Japanese Patent Application (Japanese Patent Application No. 2015-166371) filed on Aug. 26, 2015, the contents of which are incorporated herein by reference.

INDUSTRIAL APPLICABILITY

According to the present invention, a resin molded product and molding molds in which the occurrence of silver streak can be effectively prevented merely by changing a partial structure of the transparent resin molded product and by changing a cavity structure of molds corresponding to the structural change are provided.

DESCRIPTION OF REFERENCE NUMERALS

1 outer cover (resin molded product)
2 lamp body
3 molding device (two-color molding device)
11 light-transmitting portion (transparent resin)
12 non-light-transmitting portion
13 design portion
14 non-design portion
15 runner portion
16 gate trace (gate arrangement position)
17a, 17b protruding strip portion (foreign matter restraining portion)
30 common mold
31 primary mold
31a primary cavity
32 secondary mold
32a secondary cavity
34 gate
35 hot runner
36 gate pin
37, 37A, 37B runner cavity portion (non-design portion)
38a, 38b well portion (first well portion)
39 second well portion
HL head lamp
BD body

The invention claimed is:

1. A resin molded product comprising:
   a design portion;
   a non-design portion, wherein at least a part of the design portion is molded by transparent resin, and a gate used in resin molding is arranged at the non-design portion; and
   a foreign matter restraining portion which is disposed in a vicinity of a gate arrangement position of the non-design portion and configured to restrain foreign matters and bubbles contained in the transparent resin,
   wherein the foreign matter restraining portion is disposed between the gate arrangement position and the design portion, and
   wherein the gate is on a first side portion of the molded product and the foreign matter restraining portion is on a second side portion at an opposite side of the molded product, and the gate and the foreign matter restraining portion are staggered,
   wherein a gate trace is positioned at an entrance portion of the gate on the non-design portion, and the gate trace and the foreign matter restraining portion are staggered.

2. The resin molded product according to claim 1,
   wherein the foreign matter restraining portion is configured such that a thickness dimension or a width dimension of the non-design portion is partially increased.

3. The resin molded product according to claim 1,
   wherein the non-design portion contains a plurality of foreign matter restraining portions.

4. The resin molded product according to claim 1,
   wherein a first foreign matter restraining portion is disposed on the first side of the molded product, and a second foreign matter restraining portion is disposed on the second side at an opposite side of the molded product, and the gate, the first foreign matter restraining portion and the second foreign matter restraining portion are staggered.

5. A molding device comprising:
   a cavity for molding a molded product including a design portion and a non-design portion;
   a gate which is disposed at a position of the cavity corresponding to the non-design portion and is configured to inject resin into the cavity;
   a well portion which is disposed in a vicinity of the gate at the position of the cavity corresponding to the non-design portion and is configured to regulate a flow of the resin to restrain a flow of foreign matters and bubbles, wherein the well portion is disposed between the gate and the design portion, and wherein the gate is disposed on a first side of the molded product and the well position is disposed on a second side at an opposite side of the molded product, and the gate and well portion are staggered.

6. The molding device according to claim 5, wherein the well portion is formed as a concave portion which is formed by being concaved from a cavity surface of the cavity.

7. The molding device according to claim 5, wherein the non-design portion contains a plurality of well portions.

8. The molding device according to claim 5, wherein a first well portion is disposed on the first side of the molded product, and a second well portion is disposed on the second side at an opposite side of the molded product, and the gate, the first well portion and the second well portion are staggered.

* * * * *